(12) United States Patent
Montgomery et al.

(10) Patent No.: US 11,163,532 B2
(45) Date of Patent: Nov. 2, 2021

(54) SOLVING MULTIVARIATE QUADRATIC PROBLEMS USING DIGITAL OR QUANTUM ANNEALING

(71) Applicant: FUJITSU LIMITED, Kawasaki (JP)

(72) Inventors: Hart Montgomery, Redwood City, CA (US); Arnab Roy, Redwood City, CA (US); Ryuichi Ohori, Kawasaki (JP); Toshiya Shimizu, Kawasaki (JP); Takeshi Shimoyama, Kawasaki (JP); Jumpei Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 168 days.

(21) Appl. No.: 16/252,538

(22) Filed: Jan. 18, 2019

(65) Prior Publication Data
US 2020/0233643 A1 Jul. 23, 2020

(51) Int. Cl.
*G06F 7/556* (2006.01)
*G06F 17/16* (2006.01)
*G06F 17/17* (2006.01)
*H04L 9/30* (2006.01)
*H04L 9/32* (2006.01)

(52) U.S. Cl.
CPC ............... *G06F 7/556* (2013.01); *G06F 17/16* (2013.01); *G06F 17/17* (2013.01); *H04L 9/3026* (2013.01); *H04L 9/3271* (2013.01)

(58) Field of Classification Search
CPC .......... G06F 7/556; G06F 17/16; G06F 17/17; H04L 9/3026; H04L 9/3093; H04L 9/3271; H04L 9/302; G06N 3/0445; G06N 10/00; G06N 5/003

USPC .......................................................... 708/603
See application file for complete search history.

(56) References Cited

U.S. PATENT DOCUMENTS

| | | | |
|---|---|---|---|
| 10,044,638 B2 * | 8/2018 | Dadashikelayeh | ..... H04L 63/20 |
| 2018/0075342 A1 | 3/2018 | Tamura et al. | |
| 2018/0107172 A1 | 4/2018 | Takatsu | |
| 2019/0019103 A1* | 1/2019 | Dadashikelayeh | .... G06N 5/003 |
| 2020/0143910 A1* | 5/2020 | Noori | ..................... G16C 10/00 |

OTHER PUBLICATIONS

Shor, Peter W. "Polynomial-Time Algorithms for Prime Factorization and Discrete Logarithms on a Quantum Computer." SIAM Review, vol. 41, No. 2, 1999, pp. 303-332. JSTOR, JSTOR.
Grover, Lov K. "A fast quantum mechanical algorithm for database search." Proceedings of the twenty-eighth annual ACM symposium on Theory of computing. ACM, 1996.

(Continued)

*Primary Examiner* — Tan V Mai
(74) *Attorney, Agent, or Firm* — Maschoff Brennan

(57) ABSTRACT

A method may include obtaining a set of multivariate quadratic polynomials associated with a multivariate quadratic problem and generating an Ising Model connection weight matrix "W" and an Ising Model bias vector "b" based on the multivariate quadratic polynomials. The method may also include providing the matrix "W" and the vector "b" to an annealing system configured to solve problems written according to the Ising Model and obtaining an output from the annealing system that represents a set of integers. The method may also include using the set of integers as a solution to the multivariate quadratic problem.

10 Claims, 4 Drawing Sheets

(56) References Cited

OTHER PUBLICATIONS

Aharonov, Dorit, et al. "Adiabatic quantum computation is equivalent to standard quantum computation." SIAM review 50.4 (2008): 755-787.
Boixo, Sergio, et al. "Evidence for quantum annealing with more than one hundred qubits." Nature Physics 10.3 (2014): 218-224.
Cipra, Barry A. "The Ising model is NP-complete." SIAM News 33.6 (2000): 1-3.
Lucas, Andrew. "Ising formulations of many NP problems." Frontiers in Physics 2 (2014): 5.
European Search Report in Application No. 19211168.0 dated Jun. 15, 2020.
Ding et al., "Current State of Multivariate Cryptography" PostQuantum Cryptography, Part 1, Jul. 2017.
Zick et al., "Experimental quantum annealing: case study involving the graph isomorphism problem" Mar. 22, 2015.

* cited by examiner

SOLVING MULTIVARIATE QUADRATIC PROBLEMS USING DIGITAL OR QUANTUM ANNEALING

FIELD

The embodiments discussed herein are related to a method and/or system for solving multivariate quadratic problems using digital or quantum annealing.

BACKGROUND

Multivariate quadratic polynomials are in a class of problems that may be difficult to solve. As a result, Multivariate quadratic polynomial problems and their corresponding solutions may be used in various technical fields such as cryptology and cryptanalysis.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include obtaining a set of multivariate quadratic polynomials and generating an Ising Model connection weight matrix "W". In some embodiments, at least some elements of the matrix "W" and an Ising Model bias vector "b" may be determined based on the set of multivariate quadratic polynomials. The method may also include providing the matrix "W" and the vector "b" to an annealing system configured to solve problems written according to the Ising Model and obtaining an output from the annealing system that represents a set of values. The method may also include using the set of values as a solution to the multivariate quadratic polynomial problem.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Multivariable Quadratic (MQ) polynomial problems may include a class of optimization problems having a variety of applications including cryptosystems, cryptanalysis, and others. More specifically, the difficulty of solving MQ problems has resulted in many cryptosystems being based on MQ problems since they are generally too difficult and computationally expensive to result in successful attacks. Recently, however, digital and quantum annealing systems have been proposed which may use a heuristic approach to obtain solutions to optimization problems, such as MQ problems, in a manner that is faster than classical computing systems and techniques. As such, digital or quantum annealing systems may be useful in helping solve MQ problems, which may improve some technical fields such as cryptanalysis. For purposes of brevity, references to the digital and/or quantum annealer will be referred to jointly as "annealer."

In some embodiments, inputs typically used to solve MQ problems may not be configured in a manner that allows an annealing system to solve the MQ problem efficiently. In some embodiments, an Ising Model may be used to solve an MQ problem; however, MQ and Ising Model problems may need to be converted in a way that efficiently reduces the inputs. Thus, according to one or more aspects of the present disclosure, one or more operations may be performed with respect to an MQ problem in order to obtain Ising Model inputs that may be re-input to solve the MQ problem.

As such, according to one or more embodiments of the present disclosure, the operations described herein allow for an improvement in annealing systems by providing a mechanism that enables the annealing systems to solve MQ problems using an efficient reduction of both the original MQ equation and the Ising Model problem. In some embodiments, the efficiency of the method is related to the efficiency of the annealer. The methods described herein may not incorporate generic reductions, minimizing polynomial blowup in instance size, which may result in exponential degradation of efficiency. In other embodiments described below, however, the methods may include reductions which result in increased efficiency.

Embodiments of the present disclosure are explained with reference to the accompanying drawings.

Figure 1:
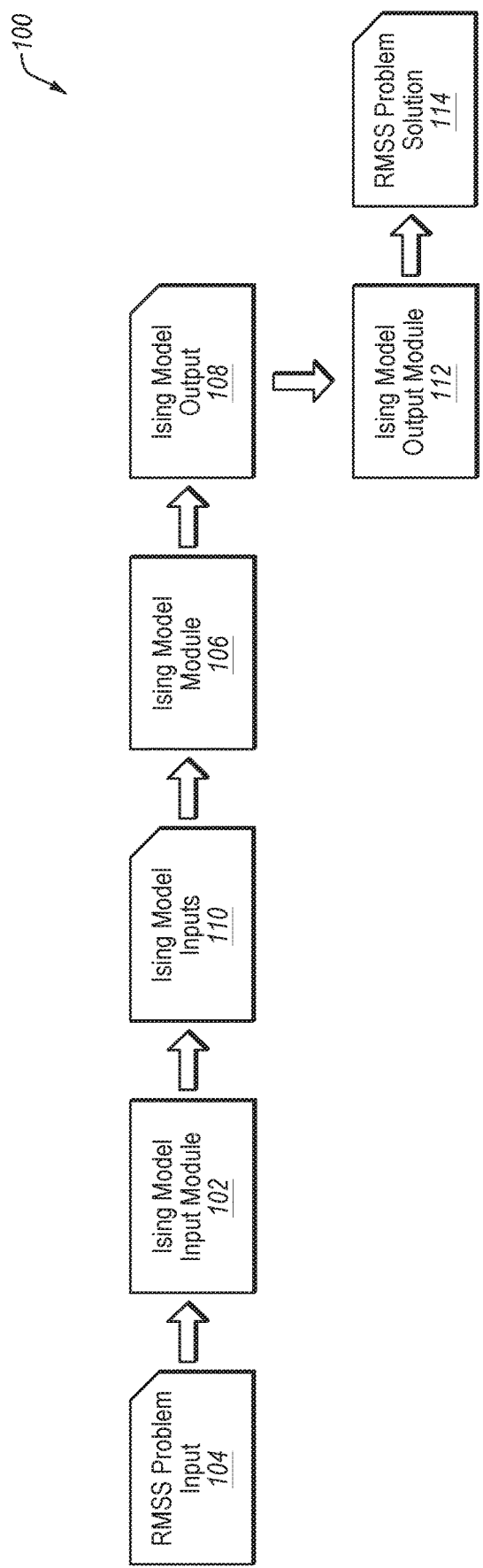
FIG. 1 illustrates an example environment related to solving multivariate quadratic polynomial problems.

FIG. 1 is a diagram representing an example environment 100 related to solving MQ problems using an annealing system, arranged in accordance with at least one embodiment described in the present disclosure. The environment 100 may include an Ising model input module 102 ("input module 102"), an Ising model Module 106 ("Ising module 106"), and an Ising model output module 112 ("output module 112").

The input module 102, the Ising module 106, and/or the output module 112 may include code and routines configured to enable a computing device to perform one or more of the operations described therewith. Additionally or alternatively, the input module 102, the Ising module 106, and/or the output module 112 may be implemented using hardware including any number of processors, microprocessors (e.g., to perform or control performance of one or more operations), field-programmable gate arrays (FPGAs), application-specific integrated circuits (ASICs) or any suitable combination of two or more thereof.

Alternatively or additionally, the input module 102, the Ising module 106, and/or the output module 112 may be implemented using a combination of hardware and software. In the present disclosure, operations described as being performed by the input module 102, the Ising module 106, and/or the output module 112 may include operations that the input module 102, the Ising module 106, and/or the output module 112 may direct a corresponding system to perform.

In some embodiments, the input module 102, the Ising module 106, and the output module 112 may each be included in an annealing system (e.g., a digital annealing system or a quantum annealing system). Additionally or alternatively, the Ising module 106 may be included in the annealing system and one or more of the input module 102 and the output module 112 may be included in a separate system that is configured to interface with the annealing system. Further, the input module 102, the Ising module 106, and the output module 112 are illustrated and described as separate elements to facilitate explanation of the present disclosure. As such, any suitable hardware and/or software arrangement configured to perform the operations described as being performed by the input module 102, the Ising module 106, and the output module 112 is within the scope of the present disclosure.

A system of multivariate quadratic polynomial equations is a set S of m simultaneous quadratic polynomial equations where the m quadratic polynomials include several variables, say $x_1, \ldots, x_n$, over some field k. A solution of a polynomial system is a set of values for the $x_i$s which belong to some algebraically closed field extension K of k, and make all equations true. When k is the field of rational numbers, K is generally assumed to be the field of complex numbers, because each solution belongs to a field extension of k, which is isomorphic to a subfield of the complex numbers.

In some embodiments, a MQ problem may be a nondeterministic polynomial time complete (NP-complete) problem. In these and other embodiments, for MQ problems it may be easy to confirm whether a proposed solution is valid, but it may be difficult to determine whether a solution exists. More particularly, although a solution to an NP-complete problem is easy to verify, it is difficult to find a solution quickly. As such, the time required to solve the problem using known algorithms increases rapidly as the size of the problem grows.

In some embodiments, the MQ problem inputs 104 may include a set S of m number of quadratic multivariate polynomials. In some instances, the MQ problem input 104 may be provided to the input module 102.

The input module 102 may be configured to perform one or more operations with respect to the MQ problem input 104 to generate the Ising model inputs 110. The input module 102 may be configured to generate the Ising model inputs 110 such that the Ising model inputs 110 may be used by the Ising module 106 to solve the MQ problem.

For example, the Ising module 106 may be configured to performs a Markov Chain Monte Carlo (MCMC) stochastic search to minimize Ising energy by finding an output vector "X" in the following expression (2) of Ising energy that minimizes the Ising Energy:

$$E(X) = -\Sigma_{\{i,j\}} W_{ij} x_i x_j - \Sigma_i b_i x_i, (i=1,2,\ldots,N) \quad (2)$$

where $x_i \in \{0, 1\}$ is the state variable or bit, $X=(x_1, x_2, \ldots x_N)$ is the vector representation of the state variable, N is the number of bits, "W" is an Ising model connection weight matrix that weighs the connections between elements of the output vector "x" and "b" is a bias vector used in determining the Ising Energy.

In some embodiments, the Ising module 106 may include an information processing apparatus that may include one or more Ising units. The Ising units may be configured to perform an operation of an Ising type energy function of a neural network by small-scale hardware based on an algorithm such as the DeGloria algorithm. The elements in the matrix W may include weighting values between neurons of the neural network. For example, an element in the matrix W may include a weighting value between a first neuron represented by row number in the matrix W and a second neuron represented by a column number in the W, where the row and column number identify the element. The information processing apparatus may work to minimize the energy in the neural network to determine a solution to a problem represented by the matrix W and vector b.

An example of an information processing apparatus that includes Ising units is provided in U.S. Publication No. 2018/0075342, filed on Aug. 30, 2017 and incorporated in this disclosure in its entirety. As described in U.S. Publication No. 2018/0075342, the Ising units may include an energy value calculation circuit and a state transition determination circuit. The energy value calculation circuit may be configured to calculate an energy value, which is based on a value of one or more of the elements in the matrix "W," that may be used to generate the output of the information processing apparatus. The output may include a solution to the problem represented by the matrix W and vector b. Additional information and examples of the state transition determination circuit is provided in U.S. Publication No. 2018/0107172, filed on Sep. 28, 2017 and incorporated in this disclosure in its entirety.

In some embodiments, the input module 102 may be configured to generate the Ising model connection weight matrix "W" and the bias vector "b" based on the MQ problem input 104. One example of how a Ising model connection weight matrix "W" and bias vector "b" may be generated is described more fully below with respect to FIG. 4.

The computed matrix W and vector b may be computed as the Ising model inputs 110. The Ising model inputs 110 may be provided to the Ising module 106.

In these or other embodiments, the input module 102 may be configured to provide the Ising model inputs 110 to the Ising module 106. The Ising module 106 may be configured to solve optimization problems written according to the Ising optimization model described above. In addition, as also indicated above, the Ising module 106 may be part of the annealing system such that the annealing system is able to use the Ising optimization model to solve optimization problems in a much faster manner than classically configured computing systems. In these or other embodiments, the Ising module 106 may be configured to generate an Ising model output 108 as a solution to the optimization problem.

Based on the determined weight matrix "W" and the determined bias vector "b", which as described above are determined according to the set S of multivariate quadratic polynomials of the MQ problem, the Ising module 106 may be configured to determine the output vector $\vec{x}$ having n log q bits where the binary recomposition of the bits into integers represent the solution to the MQ problem. As such, the annealing system may be able to solve the MQ problem using the Ising module 106 and the model inputs 110 generated by the input module 102. In these or other embodiments, the output vector may be included in the Ising model output 108.

In some embodiments, the Ising module 106 may be configured to generate the Ising model output 108 in a binary representation. In these or other embodiments, the output module 112 may receive the Ising model output 108. The output module 112 may be configured to convert the Ising model output 108 from binary representation to a series of integers which may be output as the MQ problem solution 114.

In some embodiments, the MQ problem solution 114 may be used in various situations. For example, the MQ problem may be used in cryptology. The process described with respect to FIG. 1 may be used to determine a solution of the MQ problem for the set of multivariate quadratic polynomials. The solution and the set of random integers may be used together as public/private keys in a cryptographic configuration.

Alternatively or additionally, the MQ problem solution 114 may be used in cryptanalysis to study a cryptographic configuration that employs a MQ solution. In these and other embodiments, the MQ problem solution 114 may be used to determine alternatively possible solutions to a cryptographic configuration, among other uses.

Modifications, additions, or omissions may be made to FIG. 1 without departing from the scope of the present disclosure. For example, the environment 100 may include more or fewer elements than those illustrated and described in the present disclosure.

Figure 2:
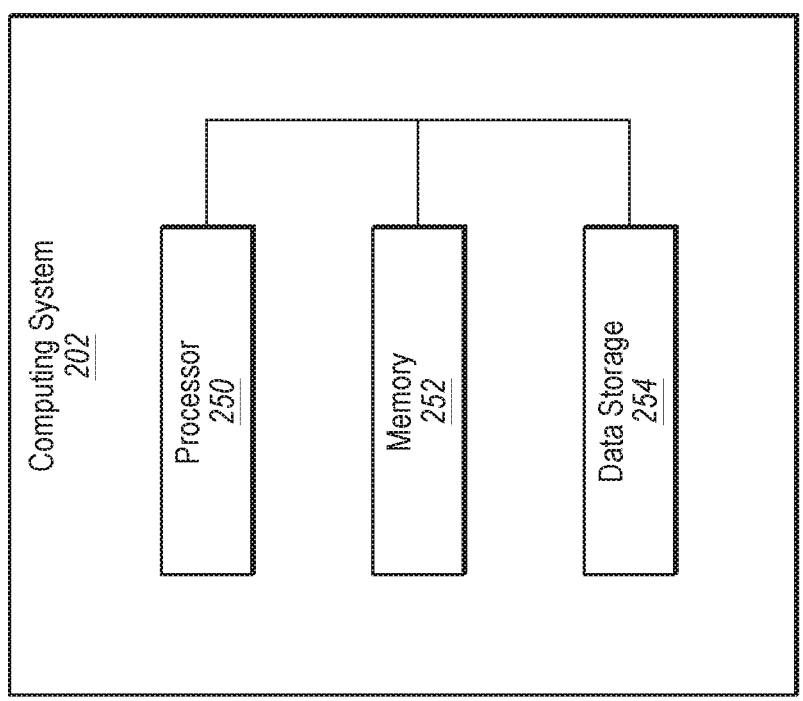
FIG. 2 illustrates an example computing system that may be configured for solving multivariate quadratic polynomial problems.

FIG. 2 illustrates a block diagram of an example computing system 202 configured to solve RMSS related problems, according to at least one embodiment of the present disclosure. The computing system 202 may be configured to implement or direct one or more operations associated with an Ising model input module (e.g., the input module 102 of FIG. 1), an Ising model module (e.g., the Ising module 106 of FIG. 1), and/or an Ising model output module (e.g., the output module 112 of FIG. 1). In some embodiments, the computing system 202 may be included in or form part of an annealing system. The computing system 202 may include a processor 250, a memory 252, and a data storage 254. The processor 250, the memory 252, and the data storage 254 may be communicatively coupled.

In general, the processor 250 may include any suitable special-purpose or general-purpose computer, computing entity, or processing device including various computer hardware or software modules and may be configured to execute instructions stored on any applicable computer-readable storage media. For example, the processor 250 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 2, the processor 250 may include any number of processors configured to, individually or collectively, perform or direct performance of any number of operations described in the present disclosure. Additionally, one or more of the processors may be present on one or more different electronic devices, such as different servers.

In some embodiments, the processor 250 may be configured to interpret and/or execute program instructions and/or process data stored in the memory 252, the data storage 254, or the memory 252 and the data storage 254. In some embodiments, the processor 250 may fetch program instructions from the data storage 254 and load the program instructions in the memory 252. After the program instructions are loaded into memory 252, the processor 250 may execute the program instructions.

The memory 252 and the data storage 254 may include computer-readable storage media for carrying or having computer-executable instructions or data structures stored thereon. Such computer-readable storage media may include any available non-transitory media that may be accessed by a general-purpose or special-purpose computer, such as the processor 250. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of In re Nuijten, 500 F.3d 1346 (Fed. Cir. 2007). Combinations of the above may also be included within the scope of computer-readable media.

Combinations of the above may also be included within the scope of computer-readable storage media. Computer-executable instructions may include, for example, instructions and data configured to cause the processor 250 to perform a certain operation or group of operations.

Modifications, additions, or omissions may be made to the computing system 202 without departing from the scope of the present disclosure. For example, in some embodiments, the computing system 202 may include any number of other components that may not be explicitly illustrated or described.

Figure 3:
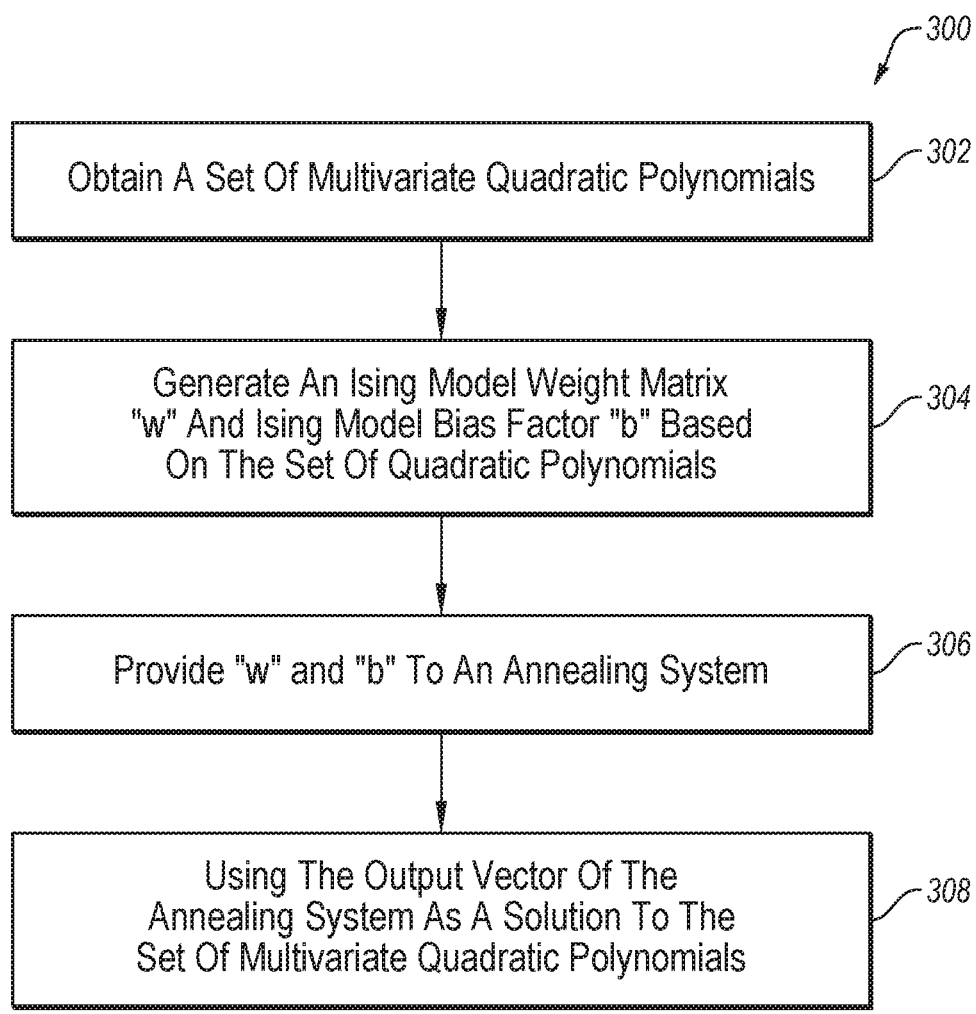
FIG. 3 is a flowchart of an example method for solving multivariate quadratic polynomial problems.

FIG. 3 illustrates a flowchart of an example method 300 of solving MQ problems according to at least one embodiment described in the present disclosure. The method 300 may be performed by any suitable system, apparatus, or device. For example, the environment 100 of FIG. 1 or the computing system 200 of FIG. 2 may perform one or more of the operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may begin at block 302, where a set of S of m simultaneous quadratic polynomial equations over some field k may be obtained. In block 304, an Ising Model connection weight matrix "W" and an Ising Model bias factor "b" may be generated. In some embodiments, at least some elements of the matrix "W" and the Ising Model bias factor "b" may be determined based on the set of quadratic polynomial equations.

In block 306, the matrix "W" and the vector "b" may be provided to an annealing system configured to solve problems written according to the Ising Model. In block 308, an output may be obtained from the annealing system that represents a vector corresponding a set of integers which may be used as a solution to the MQ problem defined by the set of multivariate quadratic polynomials. In some embodiments, the set of multivariate quadratic polynomials may be obtained from a cryptographic hashing technique and the using the set of integers may include providing the set of integers to a system applying the cryptographic hashing technique to gain access to the system.

Figure 4:
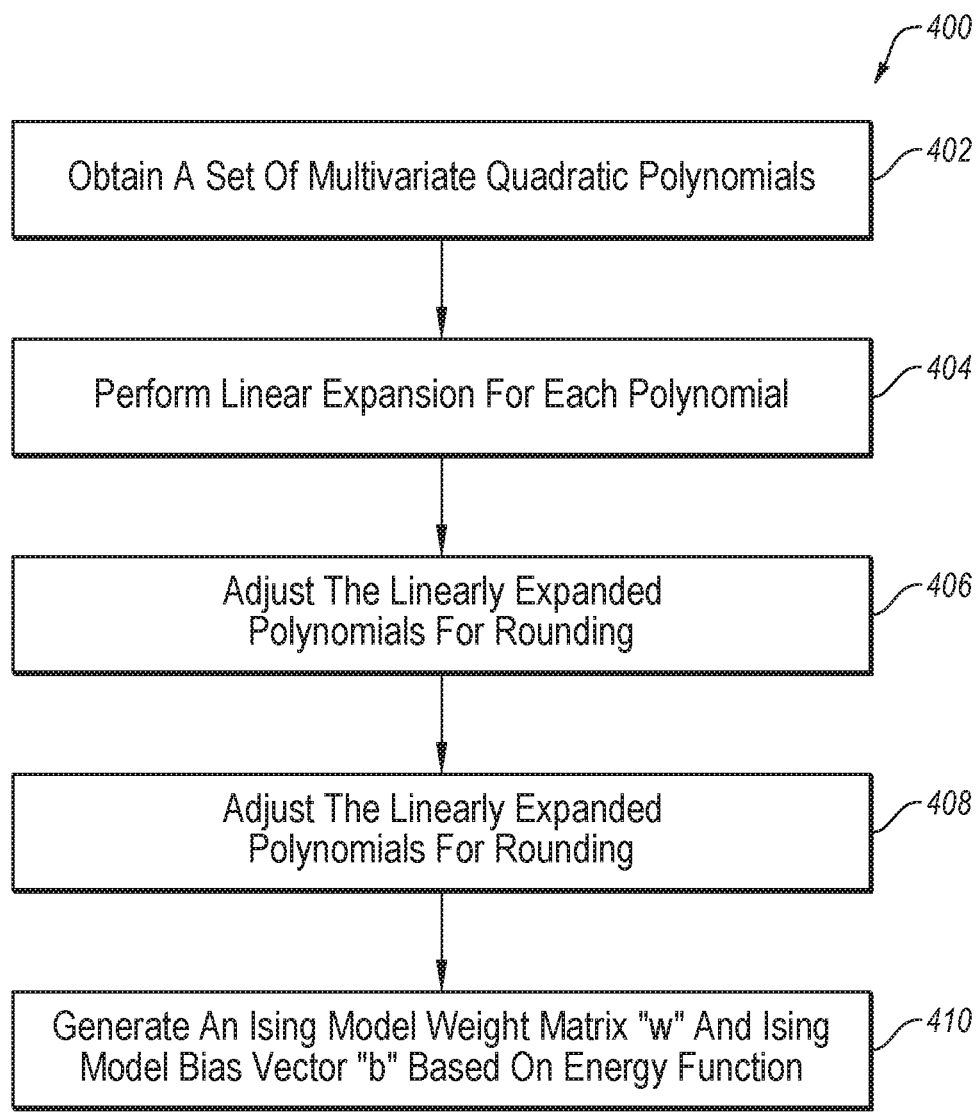
FIG. 4 is a flowchart of an example method for generating an Ising Model connection weight matrix "W" and an Ising Model bias vector "b" based on a set of multivariate quadratic polynomials.

FIG. 4 illustrates a flowchart of an example method 400 of generating an Ising Model weight matrix "W" and an Ising Model bias vector "b" according to at least one embodiment described in the present disclosure. The method 400 may be performed by any suitable system, apparatus, or device. For example, the environment 100 of FIG. 1 or the computing system 200 of FIG. 2 may perform one or more of the operations associated with the method 400 and it should be understood that the method 400 of FIG. 4 may be used in association with the method 300 of FIG. 3. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where a set of S of m simultaneous quadratic polynomial equations in n variables $x_1, \ldots x_n$ over some field k may be obtained. In this instance, the set S may be defined over a ground field as $p_i$, $i \in [m]$ over $\mathbb{F}_2$. In block 404, each polynomial of the set S is linearized. For example, for each j, $k \in [n]$, a variable $y_{jk} = x_j x_k$ is introduced, such that each polynomial $p_i$ is expressed as:

$$p_i = l_i^T \vec{x} + q_i^T \vec{y} + c_i$$

At block 404, the linearly expanded $p_i$ are adjusted for rounding by removing sufficient multiples of 2 from the set of $p_i$. More specifically, the following operation may be performed at block 404:

$$p_i = l_i^T \vec{x} + q_i^T \vec{y} + c_i - 2\sum_{j=0}^{t} 2^j b_j$$

In some embodiments, t=3 [log n] may be determined to be sufficient so as to adequately adjust for rounding, although other values for t may be used. In the operation performed at block 404, the $b_j$ terms are binary variables assigned by the annealer. They are bits included in the polynomial equation sent to the annealer, and their values enable the movement from an absolute solution to a modular solution.

In one embodiment, after the expansion of the variables at block 404, the polynomials are reduced modulo the characteristic q. As may be understood by one of skill in the art, this reduces the number of bits required to perform the rounding adjustment of step 406.

In another embodiment, for the base field $\mathbb{F}_2$, a uniform sample may be selected from [−1, 1] so as to represent the coefficient values of $1 \in \mathbb{F}_2$. For a base field $\mathbb{F}_q$, where q is an odd prime, the representative of a value in $\mathbb{F}_q$ may be chosen from the set $$\left\{-\frac{q-1}{2}, \ldots, 0, \ldots, \frac{q-1}{2}\right\}.$$

On average, this operation leads to a reduction in the number of bits required to perform the rounding adjustment.

As may be understood, this process may be performed so as to minimize the computations required by the Ising Model by requiring a solution in only mod(2) rather than requiring an absolute solution to the MQ problem. A In certain cases, the polynomials could be defined over an extension field, such as mod (31). As such, instead of merely removing multiples of 2, multiples of 31 may also be removed by performing:

$$p_i = l_i^T \vec{x} + q_i^T \vec{y} + c_i - 31\sum_{j=0}^{t} 2^j b_j$$

In such instances, each polynomial equation may be decomposed into r separate polynomial equations, where r is the degree of the extension. For concreteness, consider the degree 2 extension field $F = \mathbb{F}_2[X]/(X^2+X+1)$. Any element of F can be written as $= x_1 \alpha + x_0$, such that $\alpha^2 = -\alpha - 1$ and $x_0, x_1 \in \mathbb{F}_2$. When $(x_1\alpha + x_2)$, $(x_3\alpha + x_4) \in F$ are multiplied:

$$(x_1\alpha + x_2)\cdot(x_3\alpha + x_4) = (x_1x_4 + x_2x_3 - x_1x_3)\alpha + (x_2x_4 - x_1x_3)$$

Consequently, each quadratic polynomial p becomes decomposed as $p_1\alpha + p_2$. As such, $p_1$ and $p_2$ may be treated as separate quadratic polynomials in the base field F(2).

Returning again to FIG. 4, at block 408, an energy function for the polynomials $p_i$ by defining for all $i < j \in [n]$:

$$E_{ij} = 3y_{ij} + x_i x_j - 2y_{ij} x_i - 2y_{ij} x_j,$$

and computing the following energy function:

$$H = \Sigma_{i \in [m]} p_i^2 + \Sigma_{i < j \in [m]} E_{ij}.$$

At step 410, an Ising Model Weight matrix "W" and an Ising Model bias vector "b" are calculated by expanding the energy function H. As such, an Ising Model Weight matrix "W" and an Ising Model bias vector "b" are able to be provided to the annealing system as is described in step 306 of FIG. 3.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

The invention claimed is:

1. A method comprising:
   obtaining a set of multivariate quadratic polynomials associated with a multivariate quadratic problem;
   linearly expanding each polynomial in the set of multivariate quadratic polynomials to generate respective linearized polynomials;
   performing a reduced modulo operation with respect to each linearized polynomial;
   adjusting, after performing the reduced modulo operation, the linearized polynomials for rounding by removing sufficient multiples of the linearized polynomials;
   determining an Ising type energy function for the adjusted linearized polynomials;
   generating an Ising Model connection weight matrix "W" and an Ising Model bias vector "b" by expanding the determined Ising type energy function;
   providing the matrix "W" and the vector "b" to an annealing system configured to solve problems written according to the Ising Model;
   obtaining an output from the annealing system that represents a set of integers; and
   using the set of integers as a solution to the multivariate quadratic problem defined by the set of multivariate quadratic polynomials.

2. The method of claim 1, wherein the annealing system includes an energy value calculation circuit configured to calculate an energy value used to generate the output, wherein the energy value is based on a value of one or more of the elements in the matrix "W".

3. The method of claim 1, wherein the set of multivariate quadratic polynomials is based on a multivariate cryptography scheme and further comprising using the solution to the multivariate quadratic problem to perform a challenge to the multivariate cryptography scheme.

4. One or more non-transitory computer-readable storage media configured to store instructions that, in response to being executed, cause a system to perform operations comprising:
   obtaining a set of multivariate quadratic polynomials associated with a multivariate quadratic problem;
   linearly expanding each polynomial in the set of multivariate quadratic polynomials to generate respective linearized polynomials;
   performing a reduced modulo operation with respect to each linearized polynomial;
   adjusting, after performing the reduced modulo operation, the linearized polynomials for rounding by removing sufficient multiples of the linearized polynomials;
   determining an Ising type energy function for the adjusted linearized polynomials;
   generating an Ising Model connection weight matrix "W" and an Ising Model bias vector "b" by expanding the determined Ising type energy function;
   providing the matrix "W" and the vector "b" to an annealing system configured to solve problems written according to the Ising Model;
   obtaining an output from the annealing system that represents a set of integers; and
   using the set of integers as a solution to the multivariate quadratic problem defined by the set of multivariate quadratic polynomials.

5. The one or more non-transitory computer-readable storage media of claim 4, wherein the set of multivariate quadratic polynomials are obtained from a cryptographic technique.

6. The one or more non-transitory computer-readable storage media of claim 5, wherein the operations further comprise using the solution to the multivariate quadratic problem to perform a challenge to the cryptographic technique.

7. The one or more non-transitory computer-readable storage media of claim 4, wherein the annealing system includes an energy value calculation circuit configured to calculate an energy value used to generate the output, wherein the energy value is based on a value of one or more of the elements in the matrix "W".

8. A system comprising:
   one or more computer-readable storage media configured to store instructions; and
   one or more processors communicatively coupled to the one or more computer-readable storage media and configured to, in response to execution of the instructions, cause the system to perform operations, the operations comprising:
      obtaining a set of multivariate quadratic polynomials associated with a multivariate quadratic problem;

linearly expanding each polynomial in the set of multivariate quadratic polynomials to generate respective linearized polynomials;

performing a reduced modulo operation with respect to each linearized polynomial;

adjusting, after performing the reduced modulo operation, the linearized polynomials for rounding by removing sufficient multiples of the linearized polynomials;

determining an Ising type energy function for the adjusted linearized polynomials;

generating an Ising Model connection weight matrix "W" and an Ising Model bias vector "b" by expanding the determined Ising type energy function;

providing the matrix "W" and the vector "b" to an annealing system configured to solve problems written according to the Ising Model;

obtaining an output from the annealing system that represents a set of integers; and using the set of integers as a solution to the multivariate quadratic problem defined by the set of multivariate quadratic polynomials.

9. The system of claim 8, wherein the set of multivariate quadratic polynomials are obtained from a cryptographic technique, and wherein the operations further comprise using the solution to the multivariate quadratic problem to perform a challenge to the cryptographic technique.

10. The system of claim 8, wherein generating an Ising Model connection weight matrix "W" and an Ising Model bias vector "b" further comprises:

computing an energy function for the adjusted linearized polynomials.

* * * * *